US010185932B2

(12) United States Patent
Costenaro et al.

(10) Patent No.: US 10,185,932 B2
(45) Date of Patent: Jan. 22, 2019

(54) SETTING PERMISSIONS FOR LINKS FORWARDED IN ELECTRONIC MESSAGES

(75) Inventors: Daniel Paul Costenaro, Bellevue, WA (US); Jedidiah Brown, Seattle, WA (US); David Paul Limont, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/102,875

(22) Filed: May 6, 2011

(65) Prior Publication Data

US 2012/0284345 A1 Nov. 8, 2012

(51) Int. Cl.
G06F 21/62 (2013.01)
G06Q 10/10 (2012.01)
H04L 12/58 (2006.01)

(52) U.S. Cl.
CPC ....... *G06Q 10/107* (2013.01); *G06F 21/6218* (2013.01); *H04L 51/18* (2013.01); *H04L 51/24* (2013.01); *H04L 51/00* (2013.01)

(58) Field of Classification Search
CPC ... G06Q 10/107; G06F 21/6218; H04L 51/24; H04L 51/08; H04L 51/18; H04L 51/00
See application file for complete search history.

(56) References Cited

U.S. PATENT DOCUMENTS

| 5,355,472 | A | 10/1994 | Lewis |
| 5,787,480 | A | 7/1998 | Scales et al. |
| 5,864,870 | A | 1/1999 | Guck |
| 5,903,723 | A | 5/1999 | Beck ............................ 709/200 |
| 6,219,818 | B1 | 4/2001 | Freivald et al. .............. 714/799 |
| 6,275,850 | B1 | 8/2001 | Beyda et al. |
| 6,314,425 | B1 | 11/2001 | Serbinis et al. |
| 6,397,261 | B1 | 5/2002 | Erldridge et al. |
| 6,405,225 | B1 | 6/2002 | Apfel |

(Continued)

FOREIGN PATENT DOCUMENTS

| CN | 1449525 A | 10/2003 |
| CN | 1749998 A | 3/2006 |

(Continued)

OTHER PUBLICATIONS

Decouchant et al.; "Griffon: A Cooperative, Structured, Distributed Document Editor"; 1993; http://citeseerx.ist.psu.edu/viewdoc/download?doi=10.1.1.51.759&rep=rep1&type=pdf; 28 pages.

(Continued)

*Primary Examiner* — Nam T Tran

(57) ABSTRACT

A permission manager detects when the message including the link is forwarded and sends a notification to the author indicating that the message was forwarded to another recipient. A notification may also be sent to the recipient who received the forwarded message indicating that the author has been notified that the recipient is not authorized to access the linked content within the forwarded message. The author may set the permissions for accessing the linked content from permission options that are displayed with the notification message sent by the permission manager. Once the permissions are set, the permission manager may send a notification to the recipient of the forwarded message with information relating to the set permissions.

18 Claims, 7 Drawing Sheets

(56) References Cited

U.S. PATENT DOCUMENTS

| | | | |
|---|---|---|---|
| 6,493,758 B1 | 12/2002 | McLain | 709/227 |
| 6,533,822 B2 | 3/2003 | Kupiec | 715/253 |
| 6,687,741 B1 | 2/2004 | Ramaley et al. | 709/206 |
| 6,718,368 B1 | 4/2004 | Ayyadurai | |
| 6,763,496 B1 | 7/2004 | Hennings et al. | |
| 6,782,423 B1 | 8/2004 | Nakayama et al. | |
| 6,839,741 B1 | 1/2005 | Tsai | |
| 6,883,009 B2 | 4/2005 | Yoo | |
| 6,948,131 B1 | 9/2005 | Neven | |
| 6,954,934 B2 | 10/2005 | Kumar | |
| 6,978,276 B2 | 12/2005 | Demsky et al. | |
| 7,003,551 B2 | 2/2006 | Malik | |
| 7,028,075 B2 | 4/2006 | Morris | 709/206 |
| 7,054,905 B1 | 5/2006 | Hanna et al. | |
| 7,089,287 B2 | 8/2006 | Bellotti et al. | |
| 7,107,518 B2 | 9/2006 | Ramaley et al. | 715/235 |
| 7,113,948 B2 | 9/2006 | Jhingan et al. | |
| 7,127,670 B2 | 10/2006 | Bendik | |
| 7,130,885 B2 | 10/2006 | Chandra et al. | 709/206 |
| 7,143,091 B2 | 11/2006 | Charnock et al. | |
| 7,178,099 B2 | 2/2007 | Meyer et al. | 715/210 |
| 7,194,514 B1 | 3/2007 | Yen et al. | 709/206 |
| 7,290,034 B2 | 10/2007 | Budd et al. | 709/206 |
| 7,353,232 B1 | 4/2008 | Kalucha et al. | |
| 7,392,280 B2 | 6/2008 | Rohall et al. | 709/201 |
| 7,401,291 B2 | 7/2008 | Ramaley et al. | |
| 7,409,394 B2 | 8/2008 | Lee | |
| 7,409,424 B2 | 8/2008 | Parker | 709/206 |
| 7,424,543 B2 | 9/2008 | Rice, III | |
| 7,424,676 B1 | 9/2008 | Carlson et al. | |
| 7,444,382 B2 | 10/2008 | Malik | |
| 7,509,386 B2 | 3/2009 | Miyashita | |
| 7,536,440 B2 | 5/2009 | Budd et al. | 709/206 |
| 7,546,352 B1 | 6/2009 | Sukadev et al. | |
| 7,565,409 B2 | 7/2009 | Heilbron et al. | |
| 7,580,982 B2 | 8/2009 | Owen et al. | |
| 7,593,943 B2 | 9/2009 | Clarke et al. | |
| 7,650,387 B2 | 1/2010 | Foo | 709/214 |
| 7,730,082 B2 | 6/2010 | Sah et al. | 707/770 |
| 7,752,269 B2 | 7/2010 | Chan et al. | |
| 7,783,711 B2 * | 8/2010 | LeVasseur et al. | 709/206 |
| 7,783,972 B2 | 8/2010 | Camps et al. | 715/255 |
| 7,814,425 B1 | 10/2010 | O'Shaugnessy et al. | |
| 7,840,642 B2 | 11/2010 | Naick et al. | |
| 7,908,332 B2 | 3/2011 | Malik | |
| 7,917,591 B2 | 3/2011 | Vakkalanka | |
| 7,970,850 B1 | 6/2011 | Callanan | |
| 8,108,464 B1 | 1/2012 | Rochelle et al. | |
| 8,140,975 B2 | 3/2012 | Lemay et al. | |
| 8,145,707 B2 | 3/2012 | Thayer et al. | |
| 8,176,123 B1 | 5/2012 | Wang et al. | |
| 8,185,591 B1 | 5/2012 | Lewis | |
| 8,196,029 B1 | 6/2012 | Rucker | |
| 8,458,269 B2 | 6/2013 | Friedman et al. | |
| 8,682,989 B2 | 3/2014 | Meisels et al. | |
| 8,965,983 B2 | 2/2015 | Costenaro et al. | |
| 9,137,185 B2 | 9/2015 | Costenaro et al. | |
| 9,165,285 B2 | 10/2015 | Schultz et al. | |
| 2001/0051991 A1 | 12/2001 | Beyda et al. | |
| 2001/0054073 A1 | 12/2001 | Ruppert et al. | |
| 2002/0016818 A1 | 2/2002 | Kirani et al. | |
| 2002/0059384 A1 | 5/2002 | Kaars | |
| 2002/0062356 A1 | 5/2002 | Clarke et al. | |
| 2002/0065892 A1 | 5/2002 | Malik | |
| 2002/0107931 A1 | 8/2002 | Singh et al. | |
| 2002/0129056 A1 | 9/2002 | Conant et al. | |
| 2002/0133633 A1 | 9/2002 | Kumar | |
| 2002/0138586 A1 | 9/2002 | Paleiov et al. | |
| 2002/0143691 A1 | 10/2002 | Ramaley et al. | |
| 2002/0174010 A1 | 11/2002 | Rice | |
| 2003/0028528 A1 | 2/2003 | Christensen et al. | |
| 2003/0028600 A1 | 2/2003 | Parker | |
| 2003/0055907 A1 | 3/2003 | Stiers | 709/206 |
| 2003/0112273 A1 | 6/2003 | Hadfield et al. | |
| 2003/0131062 A1 | 7/2003 | Miyashita | |
| 2004/0034688 A1 | 2/2004 | Dunn | |
| 2004/0068545 A1 | 4/2004 | Daniell et al. | |
| 2004/0103044 A1 | 5/2004 | Vandewater et al. | 705/26.1 |
| 2004/0158607 A1 | 8/2004 | Coppinger et al. | 709/206 |
| 2004/0186894 A1 | 9/2004 | Jhingan et al. | 709/207 |
| 2004/0243672 A1 | 12/2004 | Markki et al. | |
| 2004/0261082 A1 | 12/2004 | Steere et al. | |
| 2005/0010799 A1 | 1/2005 | Kelley et al. | |
| 2005/0033813 A1 | 2/2005 | Bhogal et al. | |
| 2005/0044492 A1 | 2/2005 | Ramaley et al. | |
| 2005/0060382 A1 | 3/2005 | Spector | 709/213 |
| 2005/0091289 A1 | 4/2005 | Shappell et al. | |
| 2005/0114672 A1 | 5/2005 | Duncan et al. | |
| 2005/0122345 A1 | 6/2005 | Kim et al. | |
| 2005/0166154 A1 | 7/2005 | Wilson et al. | 715/751 |
| 2005/0188026 A1 | 8/2005 | Hilbert et al. | 709/206 |
| 2005/0251443 A1 | 11/2005 | Chan | 705/14.721 |
| 2005/0289221 A1 | 12/2005 | Steele | |
| 2006/0004819 A1 | 1/2006 | Claudatos et al. | |
| 2006/0020673 A1 | 1/2006 | Sorge et al. | |
| 2006/0031309 A1 | 2/2006 | Luoffo et al. | 709/206 |
| 2006/0075046 A1 | 4/2006 | Yozell-Epstein et al. | |
| 2006/0095527 A1 | 5/2006 | Malik | |
| 2006/0161516 A1 | 7/2006 | Clarke et al. | |
| 2006/0195526 A1 | 8/2006 | Lederer et al. | 709/206 |
| 2006/0206570 A1 | 9/2006 | Heidloff et al. | 709/206 |
| 2006/0224679 A1 | 10/2006 | Kikuchi et al. | |
| 2006/0242208 A1 | 10/2006 | Goldick | |
| 2006/0259524 A1 | 11/2006 | Horton | |
| 2006/0282762 A1 | 12/2006 | Diamond et al. | 715/235 |
| 2006/0294455 A1 | 12/2006 | Morris et al. | |
| 2007/0005717 A1 | 1/2007 | Thierry et al. | |
| 2007/0022166 A1 | 1/2007 | Bhogal et al. | 709/206 |
| 2007/0118598 A1 | 5/2007 | Bedi et al. | |
| 2007/0118794 A1 | 5/2007 | Hollander et al. | |
| 2007/0130259 A1 | 6/2007 | Daniell et al. | |
| 2007/0136814 A1 | 6/2007 | Lee et al. | |
| 2007/0143419 A1 | 6/2007 | Plas | 709/206 |
| 2007/0143425 A1 | 6/2007 | Kieselbach et al. | 709/206 |
| 2007/0168459 A1 | 7/2007 | Fujita et al. | |
| 2007/0192490 A1 | 8/2007 | Minhas | |
| 2007/0198913 A1 | 8/2007 | Terao et al. | |
| 2007/0208782 A1 | 9/2007 | Carter et al. | |
| 2007/0233794 A1 * | 10/2007 | Singh | G06Q 10/107 709/206 |
| 2007/0271344 A1 | 11/2007 | Danasekaran et al. | |
| 2007/0271502 A1 | 11/2007 | Bedi et al. | |
| 2007/0283267 A1 | 12/2007 | Jeffrey et al. | |
| 2008/0005139 A1 | 1/2008 | Hysom et al. | |
| 2008/0028017 A1 | 1/2008 | Garbow et al. | |
| 2008/0059539 A1 | 3/2008 | Chin et al. | |
| 2008/0120382 A1 | 5/2008 | Heidloff et al. | |
| 2008/0244721 A1 | 10/2008 | Barrus | |
| 2008/0250474 A1 | 10/2008 | Bhogal et al. | |
| 2008/0256458 A1 | 10/2008 | Aldred et al. | |
| 2008/0281924 A1 | 11/2008 | Gadwale | 709/206 |
| 2008/0282159 A1 | 11/2008 | Vanderwende et al. | 715/700 |
| 2008/0288862 A1 | 11/2008 | Smetters et al. | |
| 2009/0006948 A1 | 1/2009 | Parker et al. | |
| 2009/0024931 A1 | 1/2009 | Bae | |
| 2009/0030919 A1 | 1/2009 | Brezina et al. | |
| 2009/0030997 A1 | 1/2009 | Malik | |
| 2009/0031245 A1 | 1/2009 | Brezina et al. | |
| 2009/0063520 A1 | 3/2009 | Kimura | |
| 2009/0094514 A1 | 4/2009 | Dargahl et al. | |
| 2009/0100109 A1 | 4/2009 | Turski et al. | |
| 2009/0157831 A1 | 6/2009 | Tian et al. | 709/206 |
| 2009/0187852 A1 | 7/2009 | Tsurata | |
| 2009/0210721 A1 | 8/2009 | Phillips | |
| 2009/0248808 A1 | 10/2009 | Izumi | 709/206 |
| 2009/0313256 A1 | 12/2009 | Konduri et al. | |
| 2009/0319618 A1 | 12/2009 | Affronti et al. | 709/206 |
| 2010/0011032 A1 | 1/2010 | Fukuoka | |
| 2010/0017701 A1 | 1/2010 | Bargeron et al. | 715/230 |
| 2010/0023492 A1 | 1/2010 | Lucas | |
| 2010/0057765 A1 | 3/2010 | Dispensa et al. | 707/102 |
| 2010/0057864 A1 | 3/2010 | Laird-McConnell | |
| 2010/0057872 A1 | 3/2010 | Koons et al. | |
| 2010/0070448 A1 | 3/2010 | Omoigui | |

(56) References Cited

U.S. PATENT DOCUMENTS

| | | |
|---|---|---|
| 2010/0070588 A1 | 3/2010 | Sinn et al. |
| 2010/0076989 A1 | 3/2010 | Jakobson |
| 2010/0082713 A1 | 4/2010 | Frid-Nielsen et al. ....... 707/821 |
| 2010/0095198 A1 | 4/2010 | Bultrowicz et al. .......... 715/234 |
| 2010/0100566 A1 | 4/2010 | Hronopoulos |
| 2010/0106551 A1 | 4/2010 | Koskimies et al. |
| 2010/0125640 A1 | 5/2010 | Boddington et al. |
| 2010/0169295 A1 | 7/2010 | Kanomori |
| 2010/0169439 A1 | 7/2010 | O'Sullivan et al. |
| 2010/0169440 A1 | 7/2010 | O'Sullivan et al. .......... 709/206 |
| 2010/0191774 A1 | 7/2010 | Mason et al. |
| 2010/0198927 A1 | 8/2010 | Tonnison et al. ............. 709/206 |
| 2010/0228611 A1 | 9/2010 | Shenfield |
| 2010/0228989 A1 | 9/2010 | Neystadt et al. |
| 2010/0235763 A1 | 9/2010 | Massand |
| 2010/0273456 A1 | 10/2010 | Wolovitz et al. |
| 2010/0281224 A1 | 11/2010 | Ho et al. |
| 2010/0306180 A1 | 12/2010 | Johnson et al. |
| 2010/0306330 A1 | 12/2010 | Friedman ...................... 709/206 |
| 2011/0055177 A1 | 3/2011 | Chakra et al. |
| 2011/0065419 A1 | 3/2011 | Book |
| 2011/0066955 A1 | 3/2011 | Olson et al. |
| 2011/0113104 A1 | 5/2011 | Bhogal et al. |
| 2011/0119593 A1 | 5/2011 | Jacobson et al. |
| 2011/0145363 A1 | 6/2011 | Ananthanarayanan et al. |
| 2011/0161435 A1 | 6/2011 | Mancuso |
| 2011/0276897 A1 | 11/2011 | Crevier et al. |
| 2011/0295959 A1 | 12/2011 | Martin et al. |
| 2012/0095890 A1 | 4/2012 | Santarlas |
| 2012/0117159 A1 | 5/2012 | Chakra et al. |
| 2012/0151379 A1 | 6/2012 | Schultz et al. |
| 2012/0192064 A1 | 7/2012 | Antebi et al. |
| 2012/0278281 A1 | 11/2012 | Meisels et al. |
| 2012/0278401 A1 | 11/2012 | Meisels et al. |
| 2012/0278402 A1 | 11/2012 | Limont et al. |
| 2012/0278403 A1 | 11/2012 | Costenaro et al. |
| 2012/0278404 A1 | 11/2012 | Meisels et al. |
| 2012/0278405 A1 | 11/2012 | Costenaro et al. |
| 2012/0278407 A1 | 11/2012 | Meisels et al. |
| 2012/0284344 A1 | 11/2012 | Costenaro et al. |
| 2014/0173423 A1 | 6/2014 | Meisels et al. |
| 2016/0006832 A1 | 1/2016 | Costenaro et al. |
| 2016/0043976 A1 | 2/2016 | Schultz et al. |

FOREIGN PATENT DOCUMENTS

| | | |
|---|---|---|
| CN | 1753400 A | 3/2006 |
| CN | 1795654 | 6/2006 |
| CN | 1831827 A | 9/2006 |
| CN | 1971553 A | 5/2007 |
| CN | 101009667 A | 8/2007 |
| CN | 101079846 A | 11/2007 |
| CN | 101655845 A | 2/2010 |
| CN | 101655870 | 2/2010 |
| EP | 933712 A2 | 8/1999 |
| JP | H05135056 A | 6/1993 |
| JP | 08235231 A | 9/1996 |
| JP | 10269236 A | 10/1998 |
| JP | 11161584 A | 6/1999 |
| JP | 11345182 A | 12/1999 |
| JP | 2001043151 A | 2/2001 |
| JP | 2001307006 A | 11/2001 |
| JP | 2002049615 | 2/2002 |
| JP | 2002091813 A | 3/2002 |
| JP | 2005011354 A | 1/2005 |
| JP | 2005025620 A | 1/2005 |
| JP | 2005084945 | 3/2005 |
| JP | 2005129061 A | 5/2005 |
| JP | 2007501969 | 2/2007 |
| JP | 2007213511 A | 8/2007 |
| JP | 2008-500646 | 1/2008 |
| RU | 2373653 | 11/2009 |
| WO | 2003052622 | 6/2003 |
| WO | 2005027404 | 3/2004 |
| WO | 2007-133504 | 11/2007 |
| WO | 2009023769 A1 | 2/2009 |
| WO | 2009158108 A2 | 12/2009 |
| WO | 2010041505 A1 | 4/2010 |
| WO | 2010104659 A2 | 9/2010 |

OTHER PUBLICATIONS

Devendorf, G.; "Outlook putting attachments in Sharepoint"; Feb. 13, 2008; http://my.advisor.com/blog/garydev.nsf/d6plinks/GDEF-7BSUA2; 5 pages.

Egnyte.co; "Cloud File Server Features—Complete List"; accessed Dec. 30, 2010, at http://www.egnyte.co.uk/file-server/online-file-server-features.html; 5 pgs.

Gigaom.com; "*How to Use Adobe Acrobat for Online Document Reviews*"; Retrieved Date: Jan. 4, 2010; http://gigaom.com/collaboration/how-to-use-adobe-acrobat-for-online-document-reviews/; 8 pgs.

Harmoni.ie; "harmon.ie for SharePoint"; accessed Apr. 1, 2011 at http://harmon.ie/SharePoint/Product/Features/CollaborateUsingDocuments; 3 pgs.

Hsieh, H., et al.; "Activity Links: Supporting Communication and Reflection about Action"; Center for the Study of Digital Libraries and Dept. of Computer Science, Texas A&M University, USA; HT '05 Sep. 6-9, 2005, Salzburg, AT; 10 pgs.

Jatowt, A., et al.; "Change Summarization in Web Collections"; University of Tokyo, Japan; 2004; accessed on or about Jan. 4, 2010 at http://citeseerx.ist.psu.edu/viewdoc/download?doi=10.1.1.73.7999&rep=rep1&type=pdf; 10 pgs.

Lenahan, T.; "5 New Google Docs Features You Might Have Missed"; Apr. 6, 2010; http://www.makeuseof.com/tag/5-google-docs-features-making/; 9 pgs.

Masternewmedia.org; "*Collaborative Document Review Online: PleaseReview*"; Retrieved Date: Jan. 4, 2010; http://www.masternewmedia.org/news/2005/06/02/collaborative_document_review_online_pleasereview.htm; 4 pgs.

McCoy, J., et al.; "SharePoint Workspace and the Office Document Cache"; Mar. 12, 2010-Sep. 29, 2010; retrieved Dec. 30, 2010, at http://blogs.msdn.com/b/sharepoint_workspace_development_team/archive/2010/03/12/sharepoint-workspace-and-the-office-document-cache.aspx; 2 pgs.

Microsoft Support; "Attachment Manager for Outlook"; accessed Jul. 1, 2011 at http://assistmyteam.com/downloads/manuals/AttachmentManager.pdf; 14 pgs.

Microsoft Support; "OL2000: Changing from Local Delivery to Server and Offline"; Oct. 8, 2003, rev. 1.0; accessed Jul. 1, 2011 at http://support.microsoft.com/kb/197651; 4 pgs.

Microsoft; "*Going beyond e-mail: Collaborating with Office*"; Retrieved Date: Jan. 4, 2010; http://office.microsoft.com/en-us/outlook-help/going-beyond-e-mail-collaborating-with-office-HA001017429.aspx; 10 pgs.

Office-Addins.com; "Attachments Processor for Microsoft Outlook"; accessed Jan. 6, 2011, at http://www.-office-addins.com/-outlook-addins/attachments-processor.html; 3 pgs.

phpBB—Free and Open Source Forum Software; "Display last edited time information"; accessed Jan. 6, 2011, at http://www.phpbb.com/community/viewtopic.php?f=46&t=589514; 7 pgs.

Redline-Software.com; "Outlook Connector for MDaemon"; accessed Jan. 6, 2011, at http://www.redline-software.com/eng/support/docs/mdaemon/c6s4.php; 7 pgs.

RSBR.de; "Outlook Attachment Sniffer"; accessed Jan. 6, 2011, at http://www.rsbr.de/Software/OASniffer/index.htm; 2 pgs.

Sharepoint Development; "How to show last modified workflow date in a column on the main list page"; Jul. 31, 2009-Aug. 4, 2009; accessed Jan. 6, 2011, at http://www.sharepointdev.net/sharepoint-design-customization/how-to-show-last-modified-workflow-date--in-a-column-on-the-main-list-page-5094.shtml; 4 pgs.

Thapa, S.; "Microsoft SharePoint 2010—Features and Benefits"; Dec. 1, 2010; EzineMark.com; 3 pgs.

The Daily Reviewer; "Outlook Shared Attachment as Hyperlink"; accessed Dec. 30, 2010, at http://thedailyreviewer.com/windowsapps/view/outlook-shared-attachment-as-hyperlink-11367085; 5 pgs.

(56) References Cited

OTHER PUBLICATIONS

U.S. Appl. No. 12/963,091, entitled *Shared Attachments*, filed Dec. 8, 2010.
U.S. Appl. No. 13/096,830 entitled *Making Document Changes by Replying to Electronic Messages*, filed Apr. 28, 2011.
U.S. Appl. No. 13/096,854 entitled *Presenting Links to Content as Attachments in Electronic Messages*, filed Apr. 28, 2011.
U.S. Appl. No. 13/096,869, entitled *Presenting Link Information Near Links Within Electronic Messages*, filed Apr. 28, 2011.
U.S. Appl. No. 13/096,880, entitle *Upload of Attachment and Insertion of Link Into Electronic Messages*, filed Apr. 28, 2011.
U.S. Appl. No. 13/096,899, entitled *Storing Metadata Inside File to Reference Shared Version of File*, filed Apr. 28, 2011.
U.S. Appl. No. 13/102,431, entitled *Changes to Documents are Automatically Summarized in Electronic Messages*, filed May 6, 2011.
U.S. Appl. No. 13/096,936, entitled *Automatic Uploading of Attachment to a Shared Location*, filed Apr. 28, 2011.
U.S. Appl. No. 13/096,910, entitled "Uploading Attachment to Shared Location and Replacing with a Link", filed May 12, 2012.
Docstoc; "OneClick: Email Large Documents Without Attaching Files"; retrieved Jan. 7, 2011, from http://www.docstoc.com/oneclick/; 4 pgs.
Masternewmedia.com; "How to Send Large Files without Email"; Last updated: Jan. 6, 2011; retrieved Jan. 7, 2011, from http://www.masternewmedia.org/how_to_send_large_files_without_email/; 3 pgs.
MSDN.com; "How to Share Large Files Without Attaching Them"; Aug. 21, 2008; retrieved Jan. 7, 2011, from http://blogs.msdn.com/b/outlook/archive/2008/08/21/how-to-share-large-files-without-attaching-them.aspx; 3 pgs.
Sendthisfile.com; "Welcome to SendThisFile"; accessed Jan. 7, 2011, from http://www.sendthisfile.com/; 1 pg.
PCT Search Report in PCT/US2012/035710 dated Sep. 28, 2012.
Office Action dated Nov. 13, 2012, issued in U.S. Appl. No. 13/096,910.
Edholm, Y.; "*Email Attachments: The Scourge of the Network*"; Jul. 21, 2008; solutions-daily.com; http://www.solutions-daily.com/dsp_getFeaturesDetails.cfm?CID=691; 3 pg.s.
Microsoft Support; "You may receive an 'Outlook blocked access to the following potentially unsafe attachments' message in Outlook"; Last Review: May 13, 2010; http://suport.microsoft.com/kb/829982; 7 pgs.
Office Action dated Jun. 20, 2012, issued in U.S. Appl. No. 13/096,899.
Office Action dated Sep. 7, 2012, issued in U.S. Appl. No. 12/963,0919.
Office Action dated Oct. 3, 2012, issued in U.S. Appl. No. 12/096,830.
Office Action dated Jun. 4, 2013, issued in U.S. Appl. No. 13/096,936.
Office Action dated Jun. 10, 2013, issued in U.S. Appl. No. 13/102,431.
Office Action dated Jun. 11, 2013, issued in U.S. Appl. No. 13/096,910.
Office Action dated Jun. 20, 2013, issued in U.S. Appl. No. 13/096,854.
Office Action dated Jun. 21, 2013, issued in U.S. Appl. No. 13/096,830.
Office Action dated Jun. 21, 2013, issued in U.S. Appl. No. 13/096,869.
Office Action dated Jul. 16, 2013, issued in U.S. Appl. No. 13/096,880.
Office Action dated Sep. 24, 2013, issued in U.S. Appl. No. 13/096,899.
Office Action dated Feb. 11, 2013, issued in U.S. Appl. No. 13/096,899.
PCT Search Report in PCT/US2012/035707 dated Nov. 26, 2012.
PCT Search Report in PCT/US2012/035708 dated Nov. 26, 2012.
PCT Search Report in PCT/US2012/035709 dated Nov. 26, 2012.
PCT Search Report in PCT/US2012/036701 dated Nov. 28, 2012.
PCT Search Report in PCT/US2012/036702 dated Dec. 3, 2012.
Office Action dated Nov. 21, 2012, issued in U.S. Appl. No. 13/096,936.
Office Action dated Nov. 26, 2012, issued in U.S. Appl. No. 13/102,431.
Office Action dated Dec. 11, 2012, issued in U.S. Appl. No. 13/096,854.
Office Action dated Dec. 14, 2012, issued in U.S. Appl. No. 13/096,869.
Office Action dated Dec. 26, 2012, issued in U.S. Appl. No. 13/096,880.
Office Action dated Jan. 9, 2013, issued in U.S. Appl. No. 12/963,091.
Office Action dated Apr. 9, 2015, issued in U.S. Appl. No. 13/096,936, 23 pgs.
Office Action dated Apr. 20, 2015, issued in U.S. Appl. No. 13/096,880, 25 pgs.
Notice of Allowance dated Apr. 28, 2015, issued in U.S. Appl. No. 13/096,910, 23 pgs.
U.S. Appl. No. 14/188,666 entitled Making Document Changes by Replying to Electronic Messages, filed Feb. 24, 2014.
Office Action dated Jan. 15, 2014, issued in U.S. Appl. No. 13/096,854.
Office Action dated Apr. 8, 2014, issued in U.S. Appl. No. 13/102,431, 16 pgs.
Wikipedia, Message, http://en.wikipedia.org/wikiIMessage retrieved Jan. 9, 2014, p. 1-2.
Office Action dated Jun. 16, 2014, issued in U.S. Appl. No. 12/963,091, 22 pgs.
Vogel et al., "Consistency Control for Synchronous and Asynchronous Collaboration Based on Shared Objects and Activities"; Computer Supported Copperative Work (CSCW); Kluwer Academic Publishers, vol. 13, No. 5-6; Dec. 1, 2004; pp. 573-602 (cited in Apr. 23, 2015 EP Comm.).
EP Communication dated Apr. 23, 2015 in Appln No. PCT/US2012/035710, 8 pgs.
Notice of Allowance dated Jun. 15, 2015, issued in U.S. Appl. No. 12/963,091, 28 pgs.
Office Action dated Jun. 23, 2015, issued in U.S. Appl. No. 13/096,899, 30 pgs.
Office Action dated Jun. 26, 2015, issued in U.S. Appl. No. 13/096,854, 50 pgs.
EP Extended Search Report in PCT/US2012/036702 dated Aug. 12, 2014, 6 pgs.
Office Action dated Jul. 10, 2014, issued in U.S. Appl. No. 13/096,869, 29 pgs.
Office Action dated Jul. 16, 2014, issued in U.S. Appl. No. 13/102,431, 20 pgs.
Office Action dated Aug. 14, 2014, issued in U.S. Appl. No. 13/096,854, 32 pgs.
EP Extended Search Report in PCT/US2012/035708 dated Aug. 29, 2014, 6 pgs.
EP Extended Search Report in PCT/US2012/035709 dated Sep. 22, 2014, 6 pgs.
Office Action dated Sep. 25, 2014, issued in U.S. Appl. No. 12/963,091, 24 pgs.
Office Action dated Sep. 26, 2014, issued in U.S. Appl. No. 13/096,936, 29 pgs.
Office Action dated Oct. 6, 2014, issued in U.S. Appl. No. 13/096,880, 31 pgs.
Office Action dated Oct. 7, 2014, issued in U.S. Appl. No. 13/096,910, 32 pgs.
Office Action dated Oct. 23, 2014, issued in U.S. Appl. No. 13/096,899, 24 pgs.
EP Extended Search Report in PCT/US2012/035707 dated Oct. 21, 2014, 6 pgs.
EP Search Report in PCT/US2012/036701 dated Dec. 4, 2014, 5 pgs.
Notice of Allowance dated Oct. 14, 2014 issued in U.S. Appl. No. 13/102,431, 51 pgs.
Troost et al., Internet Engineering Task Force, RFC 2183 dated Aug. 1997, 12 pgs. available at: www.rfc-editor.org/rfc/rfc2183.txt.
Office Action dated Jan. 31, 2014, issued in U.S. Appl. No. 13/096,869.
U.S. Appl. No. 14/887,086, entitled Shared Attachments, filed Oct. 19, 2015.

(56) References Cited

OTHER PUBLICATIONS

U.S. Appl. No. 14/853,098, entitled "Uploading Attachment to Shared Location and Replacing with a Link", filed Sep. 14, 2015.
Chinese Office Action and Search Report Issued in Chinese Patent Application No. 201280020368.3, dated Dec. 2, 2015, 14 pgs.
Chinese Office Action and Search Report Issued in Patent Application No. 201280021905.6, dated Dec. 2, 2015, 14 pgs.
Office Action dated Nov. 23, 2015, issued in U.S. Appl. No. 13/096,936, 21 pgs.
Office Action dated Jan. 5, 2016, issued in U.S. Appl. No. 13/096,899, 19 pgs.
Chinese Office Action and Search Report Issued in Chinese Patent Application No. 201280020441.7, dated Dec. 15, 2015, 18 Pages.
Chinese Office Action dated Dec. 29, 2015 in Appln No. 201280021954.x, 16 pgs.
Chinese Office Action dated Feb. 1, 2016 in Appln No. 201280020342.9, 12 pgs.
Chinese Office Action dated Mar. 4, 2016 in Appln No. 201280020430.9, 11 pgs.
European Office Action Issued in Application No. 12777397.6, dated Mar. 3, 2016, 6 pgs.
Japanese Office Action Issued in Patent Application No. 2014-508168, dated Mar. 23, 2016, 8 Pages.
Japanese Office Action Issued in Patent Application No. 2014-508169, dated Feb. 10, 2016, 11 Pages.
Japanese Office Action Issued in Patent Application No. 2014-508170, dated dated Mar. 22, 2016, 5 Pages.
Japanese Office Action Issued in Patent Application No. 2014-508171, dated Mar. 11, 2016, 6 Pages.
Taiwan Office Action and Search Report Issued in Taiwan Patent Application No. 101110617, dated Mar. 21, 2016, 6 Pages.
U.S. Appl. No. 13/096,854, Office Action dated May 2, 2016, 35 pgs.
U.S. Appl. No. 13/096,880, Office Action dated Feb. 19, 2016, 19 pgs.
U.S. Appl. No. 13/096,936, Office Action dated Mar. 22, 2016, 20 pgs.
U.S. Appl. No. 14/188,666, Office Action dated Feb. 26, 2016, 77 pgs.
Toyoko Abe et al.; "Object Bulletin Board for Group Cooperative Work" printed in a collection of papers (1997-2006 Version 1.1) presented at DICOMO symposium sponsored by Information Processing Society of Japan on Aug. 31, 2006 (pp. 513-518) (DVD-ROM), 8 pages.
Japanese Office Action Issued in Patent Application No. 2014-510384, dated May 9, 2016, 6 Pages.
Russian Office Action Issued in Patent Application No. 2013149178, dated May 20, 2016, With English Translation. 9 Pages.
Australian Office Action Full Examination Report Issued in Patent Application No. 2012253808, dated Jul. 9, 2016, 3 Pages.
Chinese Office Action Issued in Patent Application No. 201280021905.6, dated Jul. 1, 2016, With English translation. 10 pgs.
Japanese Notice Of Allowance Issued in Patent Application No. 2014-508169, dated Jul. 12, 2016, 3 Pages. Without English Translation.
Japanese Office Action Issued in Patent Application No. 2014-510385, dated May 30, 2016, With english translation. 9 Pages.
Japanese Notice of Allowance Issued in Patent Application No. 2014-508171, dated Aug. 4, 2016, 4 Pages.
Australian Notice of Allowance in Application 2012253808, dated Nov. 28, 2016, 2 pages.
Chinese Notice of Allowance in Application 201280021954.X, dated Dec. 22, 2016, 4 pages.
Chinese Office Action in Application 201280020430.9, dated Feb. 27, 2017, 8 pages.
Japanese Notice of Allowance in Application 2014-510385, dated Oct. 13, 2016, 4 pages.
Japanese Office Action in Application 2014-510384, dated Oct. 13, 2016, 6 pages.
Taiwanese Notice of Allowance in Application 101110617, dated Nov. 16, 2016, 4 pages.
U.S. Appl. No. 13/096,830, Notice of Allowance dated Nov. 8, 2013, 8 pages.
U.S. Appl. No. 13/096,854, Advisory Action dated Dec. 3, 2014, 5 pages.
U.S. Appl. No. 13/096,869, Advisory Action dated Dec. 3, 2014, 4 pages.
U.S. Appl. No. 13/096,880, Advisory Action dated Jul. 27, 2015, 5 pages.
U.S. Appl. No. 13/096,880, Advisory Action dated Sep. 18, 2015, 3 pages.
U.S. Appl. No. 13/096,880, Advisory Action dated Oct. 15, 2015, 4 pages.
U.S. Appl. No. 13/102,431, Notice of Allowance dated Jan. 27, 2015, 2 pages.
U.S. Appl. No. 14/188,666, Notice of Allowance dated Apr. 20, 2017, 6 pages.
Japaneses Notice of Allowance in Application 2014-510384, dated Mar. 31, 2017, 3 page. (No English Translation.).
Office Action Issued in Chinese Patent Application No. 201280020342.9, dated Oct. 31, 2016, 11 Pages.
Office Action Issued in Chinese Patent Application No. 201280020368.3, dated Dec. 27, 2016, 10 Pages.
Office Action Issued in Chinese Patent Application No. 201280021905.6, dated Nov. 29, 2016, 11 Pages.
Second Office Action and Search Report Issued in Chinese Patent Application No. 201280020430.9, dated Nov. 1, 2016, 11 Pages.
JP: Office Action Issued in Japanese Patent Application No. 2014-508168, dated Oct. 7, 2016, 8 Pages.
JP: Notice of Allowance Issued in Japanese Patent Application No. 2014-508171, dated Aug. 4, 2016, 4 Pages.
AU: Office Action Issued in Australian Patent Application No. 2012253808, dated Sep. 16, 2016, 3 Pages.
U.S. Appl. No. 14/188,666, Office Action dated Oct. 25, 2016, 24 pgs.
U.S. Appl. No. 13/096,854, Office Action dated Jan. 11, 2017, 39 pgs.
U.S. Appl. No. 13/096,880, Office Action dated Oct. 25, 2016, 20 pgs.
Taiwan Office Action and Search Report Issued in Taiwan Patent Application No. 101110617, dated Jul. 26, 2016, 7 Pages.
Japanese Notice of Allowance Issued in Patent Application No. 2014-508170, dated Sep. 13, 2016, 3 Pages.
Third Office Action Issued in Chinese Patent Application No. 201280020441.7, dated Jan. 25, 2017, 10 Pages.
Chinese Office Action Issued in Patent Application No. 201280020342.9, dated Aug. 1, 2016, With English translation. 10 pages.
Chinese Second Office Action and Search Report Issued in Chinese Patent Application No. 201280020368.3, dated Aug. 5, 2016, 10 pages. With English Translation.
Chinese Second Office Action dated Aug. 29, 2016 in Application No. 201280021954.x, 5 pages.
Chinese Second Office Action Issued in Chinese Patent Application No. 201280020441.7, dated Aug. 1, 2016, 14 Pages. With English Translation.
European Office Action Issued in Application No. 12782951.3, dated Aug. 17, 2016, 6 pages.
U.S. Appl. No. 13/096,899, Office Action dated Sep. 26, 2016, 36 pages.
U.S. Appl. No. 14/887,086, Office Action dated Jan. 26, 2018, 19 pages.
Canadian Office Action in Application 2835323, dated Jan. 25, 2018, 4 pages.
Chinese Decision on Reexamination in Application 201280021905.6, dated Jan. 29, 2018, 14 pages. (No English Translation.).
European Summons in Application 12782951.3, dated Feb. 13, 2018, 7 pages.
U.S. Appl. No. 14/853,098, Office Action dated Feb. 8, 2018, 11 pages.
European Office Action in Application 12777397.6, dated Jan. 3, 2018, 6 pages.

(56) References Cited

OTHER PUBLICATIONS

U.S. Appl. No. 13/096,880, Office Action dated Jun. 14, 2017, 13 pages.
U.S. Appl. No. 14/188,666, Supplemental Notice of Allowance dated Jul. 11, 2017, 2 pages.
U.S. Appl. No. 13/096,854, Office Action dated Jun. 29, 2017, 29 pages.
U.S. Appl. No. 14/188,666, Supplemental Notice of Allowance dated Jul. 26, 2017, 2 pages.
U.S. Appl. No. 14/887,086, Office Action dated Oct. 6, 2017, 16 pages.
U.S. Appl. No. 13/096,899, Office Action dated Aug. 15, 2017, 24 pages.
U.S. Appl. No. 14/853,098, Office Action dated Aug. 4, 2017, 12 pages.
Chinese Office Action in Application 201280020441.7, dated Jun. 2, 2017, 9 pages.
Russian Notice of Allowance in Application 2013149178, dated Jun. 15, 2017, 17 pages.
Chinese Notice of Allowance in Application 201280020430.9, dated Aug. 29, 2017, 4 pages.
Chinese Office Action in Application 201280021905.6, dated Sep. 19, 2017, 9 pages.
Korean Office Action in Application 10-2013-7028430, dated Oct. 23, 2017, 11 pages.
Chinese Office Action in Application 201280020342.9, dated Sep. 29, 2017, 11 pages.
European Communication in Application 12777074.1, dated Oct. 16, 2017, 7 pages.
Korean Office Action in Application 10-2013-7028280, dated Oct. 21, 2017, 11 pages.
Chinese Office Action in Application 201280020368.3, dated Nov. 6, 2017, 10 pages.
Korean Office Action in Application 10-2013-702827, dated Oct. 23, 2017, 11 pages.
Korean Office Action in Application 10-2013-7029294, dated Oct. 23, 2017, 10 pages.
Korean Office Action in Application 10-2013-7029310, dated Nov. 27, 2017, 4 pages.
U.S. Appl. No. 13/096,854, Office Action dated Dec. 28, 2017, 29 pages.
Re@DNotify, How to forward emails "As Attachments", Retrieved on Jul. 2, 2009 by the WayBack Machine, 7 pages.
Chinese Office Action in Application 201280020368.8, dated Apr. 8, 2018, 18 pages.
Chinese Office Action in Application 201280020441.7, dated May 4, 2018, 8 pages.
European Extended Search Report in Application 12776501.4, dated Jun. 6, 2018, 7 pages.
Korean Notice of Allowance in Application 10-2013-7029310, dated May 21, 2018, 4 pages.
Korean Office Action in Application 10-2013-7028277, dated Apr. 30, 2018, 5 pages.
Korean Office Action in Application 10-2013-7028280, dated May 21, 2018, 14 pages.
Korean Office Action in Application 10-2013-7028430, dated May 14, 2018, 8 pages.
"Office Action Issued in Korean Patent Application No. 10-2013-7028223", dated Jul. 17, 2018, 9 Pages.
"Office Action Issued in Korean Patent Application No. 10-2013-7028430", dated Jun. 28, 2018, 8 Pages.
"Final Office Action Issued in Korean Patent Application No. 10-2013-7029294", dated May 28, 2018, 05 Pages.
U.S. Appl. No. 13/096,899, Office Action dated Mar. 19, 2018, 20 pages.
"Final Office Action Issued in U.S. Appl. No. 13/096,854", dated Jul. 23, 2018, 25 Pages.
Chinese Notice of Allowance in Application 201280021905.6, dated Mar. 27, 2018, 4 pages.
Chinese Decision on Reexamination in Application 201280020342.9, dated Mar. 30, 2018 15 pages.
U.S. Appl. No. 14/853,098, Notice of Allowance dated May 31, 2018, 14 pages.
U.S. Appl. No. 14/887,086, Notice of Allowance dated Jun. 6, 2018, 7 pages.
"Office Action Issued in Canadian Patent Application No. 2,835,323", dated Sep. 17, 2018, 4 pages.

\* cited by examiner

SETTING PERMISSIONS FOR LINKS FORWARDED IN ELECTRONIC MESSAGES

BACKGROUND

Users routinely send links to documents and other content to users for viewing. A user receiving the message finds the link within the message and then uses the link to access the content. A user may forward the message containing the link to other users that may not be authorized to access the linked content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A permission manager detects when an electronic message including one or more links is forwarded to another recipient. For example, an author may send a message that has permissions set that allow access to the linked content for the recipient, that is then forwarded by the recipient to another recipient. The permission manager detects when the message including the link is forwarded and sends a notification to the author indicating that the message was forwarded to another recipient. A notification may also be sent to the recipient who received the forwarded message indicating that the author has been notified that the recipient is not authorized to access the linked content within the forwarded message. The author may set the permissions for accessing the linked content from permission options that are displayed with the notification message sent by the permission manager. Once the permissions are set, the permission manager may send a notification to the recipient of the forwarded message with information relating to the set permissions.

DETAILED DESCRIPTION

Figure 1:
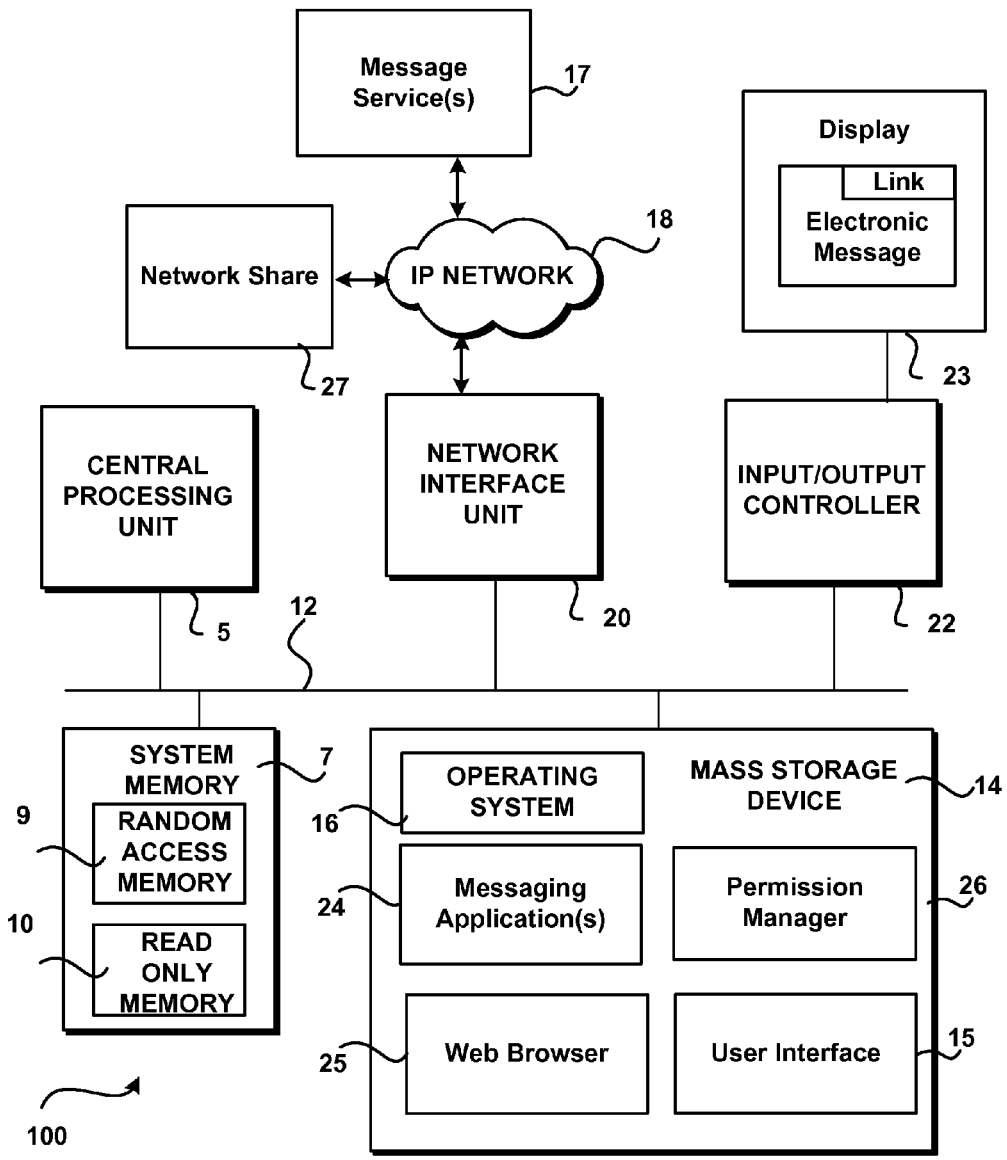
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, net book, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, messaging application(s) 24, Web Browser 25, and permission manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG.

1). Similarly, an input/output controller 22 may provide input/output to a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, including one or more messaging application(s) 24 and Web browser 25.

A user interface 15 is used by a user to interact with applications and documents. Messaging application(s) 24 may be one or more different messaging applications. For example, computer 100 may include an email application, an Instant Messaging (IM) application, an SMS, MMS application, a real-time information network (e.g. Twitter® interface), a social networking application, and the like. According to an embodiment, messaging application 24 is an email application, such as MICROSOFT OUTLOOK®. The messaging application(s) may be client based and/or web based. For example, a network based message service 17 may be used, such as: MICROSOFT WINDOWS LIVE or some other network based email and messaging service.

Network share 27 is configured to store content (e.g. documents, spreadsheet, Web content, and the like) that are accessible to one or more users through IP network 18. For example, network share 27 may store content that is accessible by users located at one or more locations. Links that are included within electronic messages may access content within network share 27 when the link is used.

Permission manager 26 is configured to set permissions for a link that is forwarded in an electronic message. Permission manager 26 may be located externally from an application, e.g. messaging application 24, as shown or may be a part of an application. Further, all/some of the functionality provided by permission manager 26 may be located internally/externally from a messaging application.

Permission manager 26 is configured to detect when an electronic message including one or more links is forwarded to a recipient that is not an original recipient of the message. The term "link" refers to an address that represents a location of content. For example, a link may be in the form of a Uniform Resource Locator (URL) that specifies a network location of where the content is stored. Selecting the link generally retrieves the content that is pointed to by the link. An author may send a message to a recipient that has permissions allowing the recipient to access to the linked content. The recipient of the original message may forward the message to another recipient that may/may not be authorized to access the linked content. Permission manager 26 detects when the message including the link is forwarded and sends a notification to the author indicating that the message was forwarded to another recipient. A notification may also be sent to the recipient who received the forwarded message from permission manager 26 indicating that the author has been notified that the recipient is not authorized to access the linked content within the forwarded message. The author may set the permissions for the recipients receiving the forwarded message by accessing permission options that are displayed with the notification message that was sent from permission manager 26. Once the permissions are set, permission manager 26 may send a notification to the recipient of the forwarded message with information relating to the set permissions. More details regarding the permission manager are disclosed below.

Figure 2:
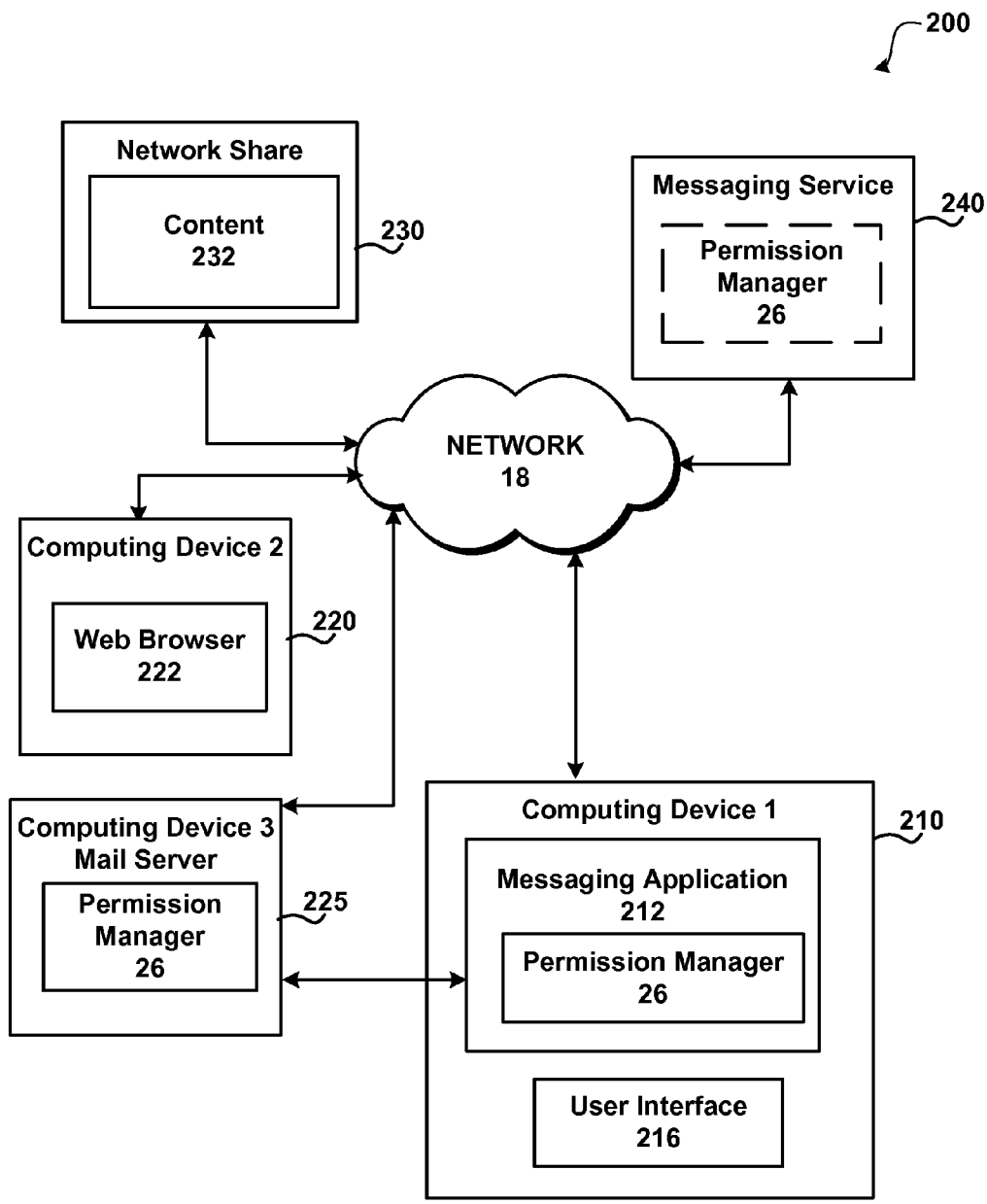
FIG. 2 shows a system for setting permissions for links that are forwarded in electronic messages.

FIG. 2 shows a system for setting permissions for links that are forwarded in electronic messages. As illustrated, system 200 includes computing device 1 (210), computing device 2 (220), computing device 3 (225), network share 230 and messaging service 240.

The computing devices may be any type of computing device that is configured to perform the operations relating to sending and receiving electronic messages that include links to content. For example, some of the computing devices may be: mobile computing devices (e.g. cellular phones, tablets, smart phones, laptops, and the like); desktop computing devices and servers. Some computing devices may be arranged to provide an online service (e.g. messaging service 240 that is configured for sending and receiving electronic messages), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, computing device 3, network share 230 and messaging service 240.

Computing device 1 includes messaging application 212 and user interface 216. As illustrated, computing device 1 is used by a user to interact with electronic messages, content in a network share (e.g. content 232) and the like.

User interface (UI) 216 is used to interact with an application and content, such as messaging application 212 and content 232. One or more user interfaces of one or more types may be used to interact with the content. For example, UI 216 may include the use of a context menu, a menu within a menu bar, a menu item selected from a ribbon user interface, a graphical menu, and the like. Generally, UI 216 is configured such that a user may easily interact with content and electronic messages. For example, a user may simply select an option within UI 216 that creates new electronic messages that include one or more links to content.

Messaging application 212 may be a client based application, such as an email application, an Instant Messaging Application, a social media application, and the like. Generally, messaging application 212 is used to send and receive electronic messages of one or more types. A network based messaging service 240 may be used in addition to messaging application 212 or instead of one or more of the different messaging applications. For example, a web interface may be used to access messaging service 240.

Messaging service 240 may be used to process electronic messages between one or more computing devices, such as computing device 1 and computing device 2. Messaging service 240 may be configured to process different message types, such as SMS, MMS, email, messages for social networks and the like. Messaging service 240 may be configured with the functionality of permission manager 26 and one or more message types may be used to communicate the electronic messages including links to content.

Computing device 2 includes one or more applications, such as a web browser (222) that may be configured to access a messaging service, such as a web based email service and to interact with content. For example, a web browser may be used to access an electronic message through an email service and then access content 232 stored in network share 230.

One or more network shares (e.g. Network share 230) may be used to store content. The content may be any type of content that is linked within a message, such as word processing documents, spreadsheets, slides, website content and the like. Network share 230 is accessible by the computing devices that interact with the content. The network share may be associated with an online service that supports online access/interaction with content.

Computing device 3 (225) is configured as a mail server. For example, messaging application 212 on computing device 1 may be used to create a message that includes a link that is to be sent to one or more recipients. When the user sends the message, computing device 3 may be configured to perform various mail processing actions and to deliver the message to the one or more recipients. As illustrated, computing device 3 includes functionality of permission manager 26. According to an embodiment, computing device 3 (mail server) using permission manager 26 determines when a message including a link is forwarded to another recipient.

Permission manager 26 is configured to detect any links to content that are included within an electronic message that is forwarded. The links may be to any type of content, such as word processing documents, spreadsheets, slides, website content and the like. Generally, the link may be to any type of content that is accessible by a computing device. Permission manager 26 is configured to detect when an electronic message including one or more links is forwarded to a recipient that is not an original recipient of the message. Permission managers on different computing devices and/or networks may be configured to communicate information between them. For example, permission manager 26 on computing device 3 may communicate to the permission manager on messaging service 240 to provide/obtain information about sent/forwarded messages that includes links. The permission manager may store permission settings for links within a central data store, such as network share 230.

Permission manager 26 detects when the message including the link is forwarded and sends a notification to the author indicating that the message was forwarded to another recipient. Permission manager 26 may also be configured to determine when the link is sent as an attachment that was included in the message sent by the author. A notification may also be sent to the recipient who received the forwarded message from permission manager 26 indicating that the author has been notified that the recipient is not authorized to access the linked content within the forwarded message. The author may set the permissions for accessing the link from permission options that are displayed with the notification message that was sent from permission manager 26. Once the permissions are set, permission manager 26 may send a notification to the recipient of the forwarded message with information relating to the set permissions.

FIGS. 3-6 show exemplary electronic messages including linked content. FIGS. 3-6 are for exemplary purpose and are not intended to be limiting.

Figure 3:
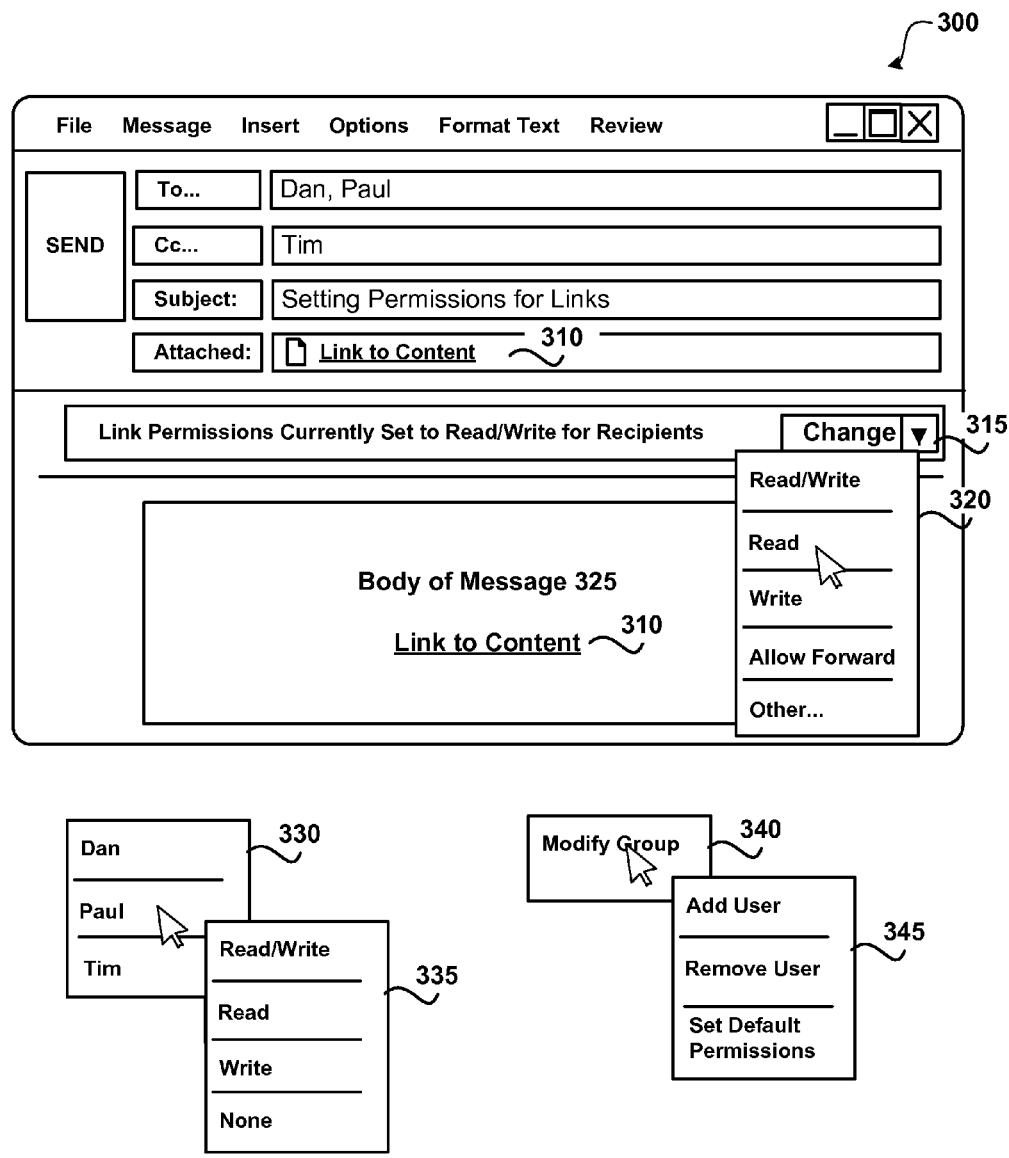
FIG. 3 shows a display of an electronic message including a link that is being composed by an author.

FIG. 3 shows a display of an electronic message including a link that is being composed by an author. As illustrated, message 300 comprises a To: field, a Cc: field, a Subject field:, an Attached field, body of the message 325 including a link to content 310, change permission options 315, 320, 330, 335, 340 and 345. More or fewer fields may be included with the electronic message.

The electronic message may be accessed and composed using one or more messaging applications. For example, a web browser may access an electronic mail service, an email application on a computing device may be configured to send/receive emails from one or more different services, and the like.

When electronic message is being composed, a link to content 310 is included with the message. The links may be to any type of content, such as word processing documents, spreadsheets, slides, websites and the like. Generally, the link may be to any type of content that is accessible by a computing device. According to an embodiment, any links to content that are included within the body of the message are displayed as linked content within an attachment area (e.g. Attached: field) such that when a user receiving the message accesses the message the linked content is viewable within an attachment area that is associated with the electronic message. In this way, the user does not have to search for the linked content within the body of the electronic message that may contain many different responses. The link that is contained within the body of the message may/may not be left within the body of the message.

A graphical indicator, such as an icon, may be displayed within the attachment area near the link. The graphical indicator may be selected to indicate a type of the content and/or other characteristics relating to the linked content. For example, a document icon may be used to show the content is a document, a web icon may be used for web content, a spreadsheet icon may be used for spreadsheets, a picture icon may be used for pictures, a message icon may be used for messages, and the like. An indicator may also be displayed that shows that the icon represents content that is linked within the body of the message. Other indicators may also be used to show other information (e.g. an indicator to show that the linked content is/is not authorized for a recipient).

Change permission option 315 provides different options for setting access permissions for the recipients of the message including link 310. For example, the author may select change permission option 315 to change the permission options for the recipients (Dan, Paul, Tim) to access the linked content that is pointed to by link 310. As illustrated, option menu 320 includes options for setting the permissions for read/write, read, write, allow forwarding, and other options. The allowed forwarding option allows the author to automatically permission recipients for forwarded messages that receive the link in a forwarded message. For example, when the allow forward option is selected, the permissions for the linked content are automatically set to allow access for each of the recipients who receive a forwarded message that includes the links from one of the original recipients.

According to an embodiment, a default set of permissions (e.g. read/write) are automatically set for any links that are included within an original message that is created by the author. Permission settings may be obtained using different menu/menu options. For example, menu 330 shows a selection for each recipient of the original message 300. Upon selection of one of the recipients from menu 330, option menu 335 is displayed that may be used to change the permissions for the selected recipient.

Menu 340 provides an option to modify the group to which the permissions apply. Selecting the modify group option 340 displays option menu 345 that allows a user to add a user from a group, remove a user from the group and set default permissions for the group. According to an embodiment, the original group is based on the recipients in the message (e.g. message 300). The author may add one or more other users to the group. For example, even though the message is only being sent to a first group of recipients, there may be other users who are on the same team that are authorized to view the linked content.

Figure 4:
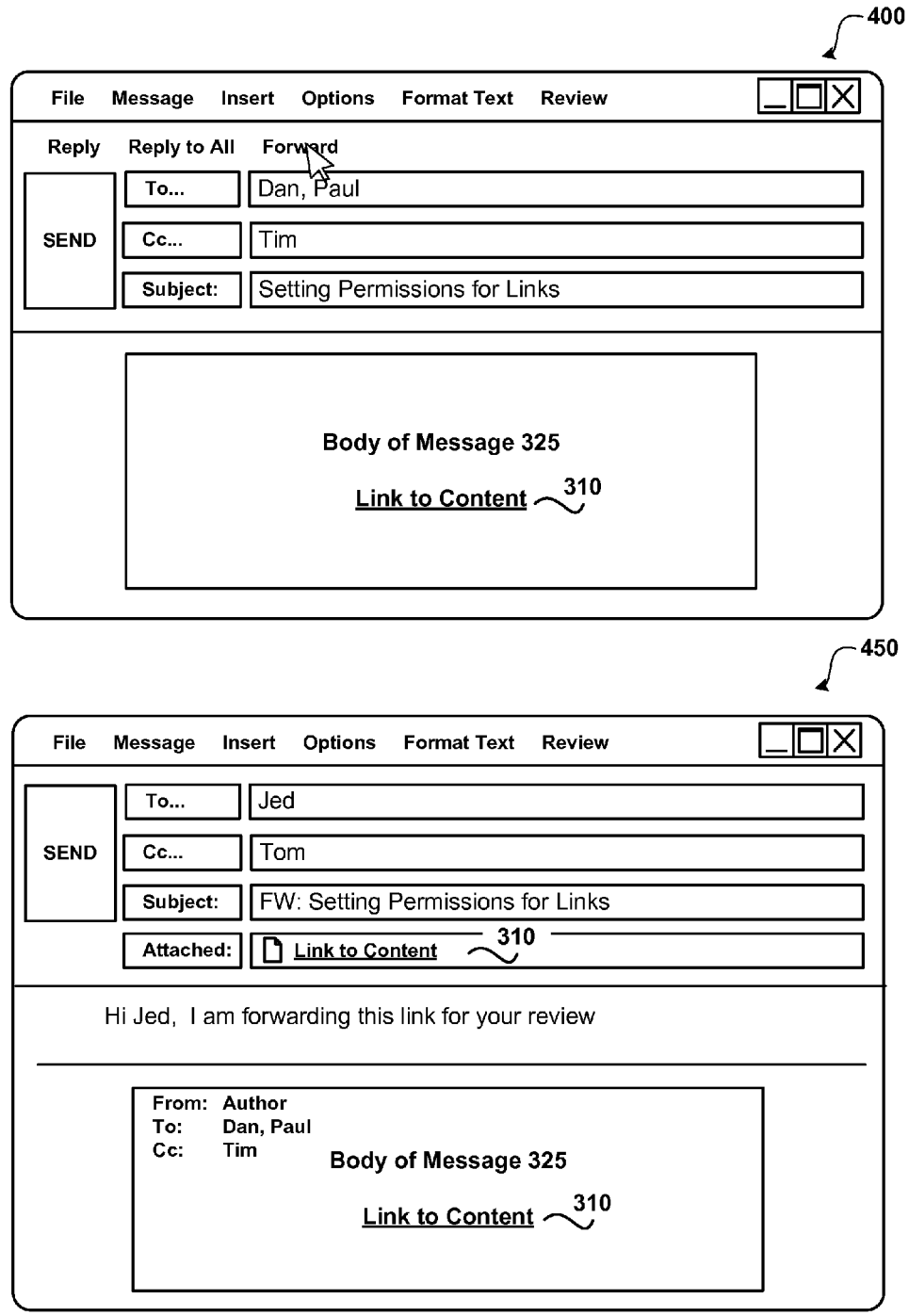
FIG. 4 shows a display of an electronic message including a link that is received by a recipient and forwarded to another recipient.

FIG. 4 shows a display of an electronic message including a link that is received by a recipient and forwarded to another recipient.

As illustrated, message 400 includes link 310 within the body of the message 400. An author creates message 400 that includes link 310 that is addressed to three recipients (Dan, Paul, Tim). A recipient of the message (e.g. Dan) determines to forward message 400 including link 310 to two additional recipients (Jed, Tom).

When message 400 is forwarded within message 450, the permission manager determines that message 400 has been forwarded to another recipient that includes a link. In response to detecting that message 400 is forwarded, the permission manager sends a notification to the author of message 400.

Figure 5:
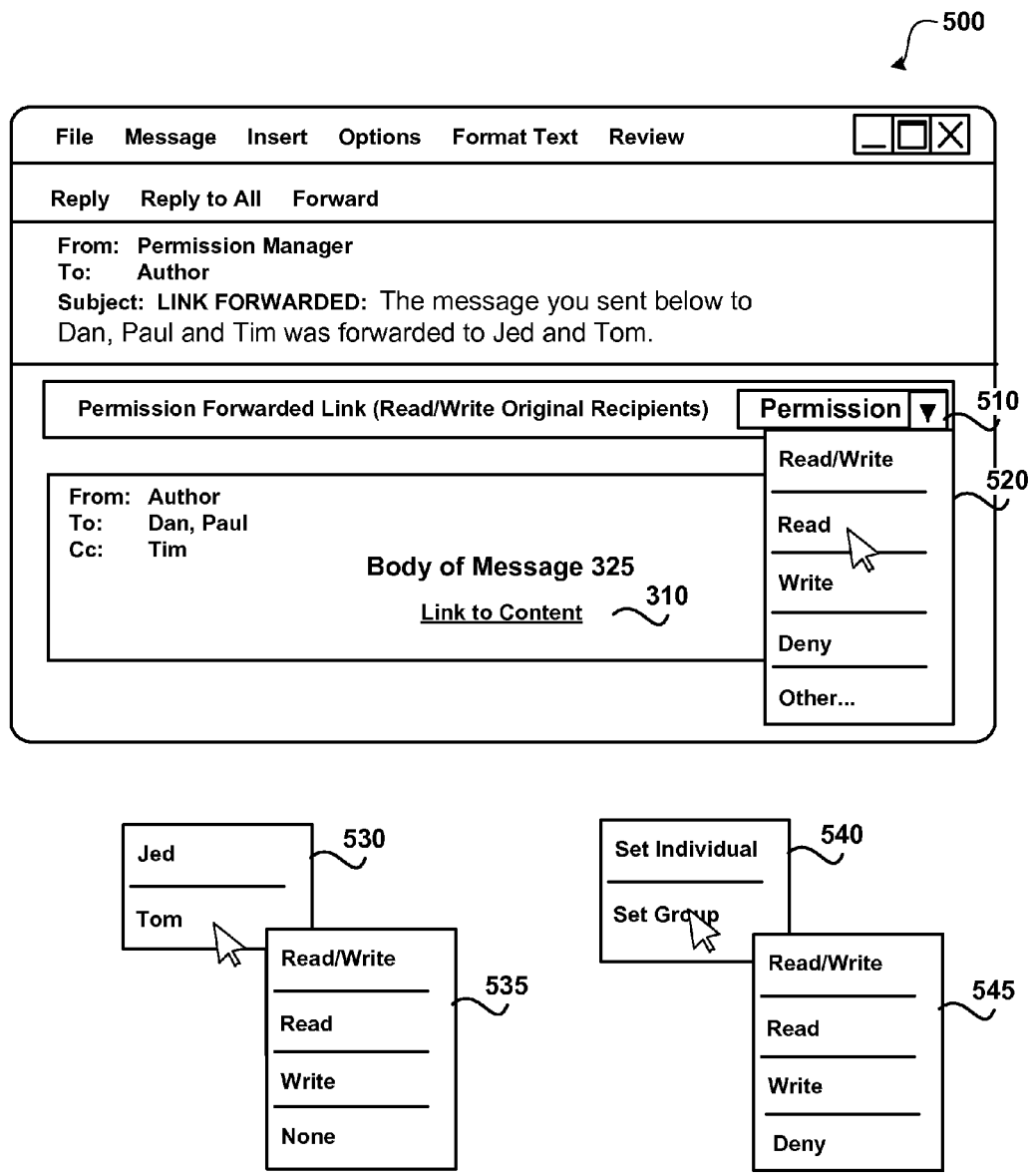
FIG. 5 shows a display of an electronic message to an author indicating that a message including a link has been forwarded to one or more additional recipients.

FIG. 5 shows a display of an electronic message to an author indicating that a message including a link has been forwarded to one or more additional recipients.

As illustrated, message 500 shows the author that a link was forwarded to another recipient. A notification message (e.g. message 500) may/may not be delivered to the author for authorized recipients of the link. For example, when a recipient of the forwarded message is already authorized to access the linked content, a notification message may not be sent to the author.

When one or more of the recipients are not authorized to access the linked content, message 500 may include permission option 510 that provides menu options for setting permissions for the recipients of the authorized message. For example, selecting permission option 510 displays options 520 that may be selected to set the permission for the link for each of the unauthorized recipients to read/write, read, write, deny access or some other option. Permission settings for the unauthorized users may be obtained using different menu/menu options.

For example, menu display 530 shows a selection for each recipient of the forwarded message 400 that is unauthorized. Upon selection of one of the recipients from menu 530, option menu 535 is displayed that may be used to change the permissions for the selected recipient.

Menu display 540 provides an option to set the permissions for each member of a group to the linked content and to set the permissions for one of the recipients. For example, when to which the permissions apply. Selecting the set group option 540 displays option menu 545 allows a user to set the permission for the group from read/write, read, write or deny.

Figure 6:
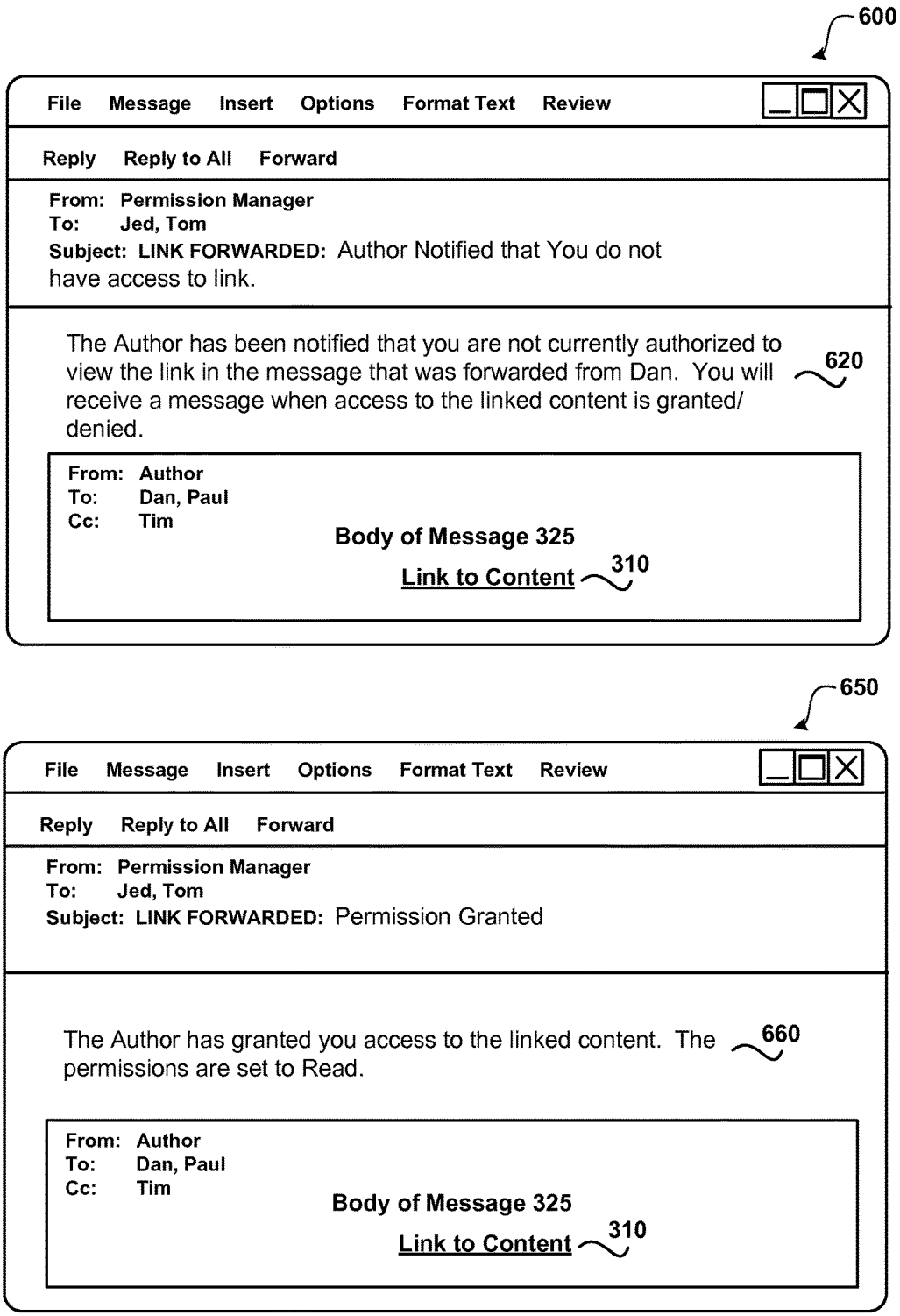
FIG. 6 shows a display of notification messages sent to recipients of a forwarded message including a link.

FIG. 6 shows a display of notification messages sent to recipients of a forwarded message including a link.

As illustrated, message 600 provides notification 620 to the unauthorized recipients that the author has been notified that the recipients do not currently have access to the link and that the author is being requested to set the permissions for each of the unauthorized recipients.

Message 650 provides a notification to a recipient of the message that permissions have been set. For example, notification 660 may provide the recipient with the permissions that were set for the recipient by the author (e.g. read permission in the current example).

Figure 7:
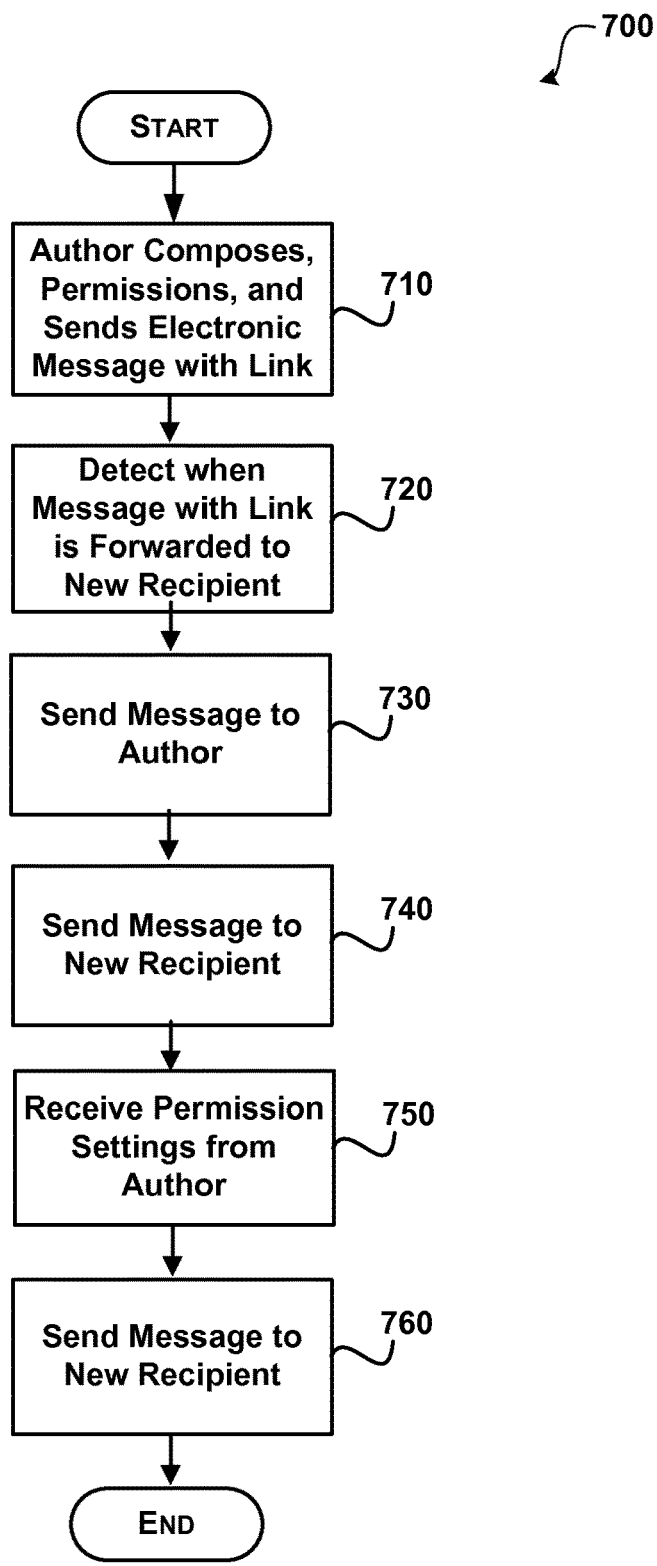
FIG. 7 shows an illustrative process for setting permissions for links that are forwarded in electronic messages.

FIG. 7 shows an illustrative process for setting permissions for links that are forwarded in electronic messages. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, process 700 moves to operation 710, where an author composes, permissions and sends an electronic message including a link. The electronic message may be any type of electronic message that includes a link. According to an embodiment, the electronic messages are email messages. Other messages may also include links, such as SMS, MMS, Instant Messages, social network messages, and the like. According to an embodiment, a default set of permissions (e.g. read/write) are automatically set for any links for each of the recipients that are included within an original message that is created by the author. The permissions for the links may also be individually configured and/or more users may be authorized to access the linked content that are not recipients of the original message.

Flowing to operation 720, any links that are forwarded in a message to a recipient are detected. For example, when a message is forwarded by a messaging system, the message may be automatically parsed to detect the links. The links may be contained anywhere within a thread of the electronic message (e.g. within a first reply to a message, a third reply and the original message).

Moving to operation 730, a notification message is sent to the author of the original message including the link that the link was forwarded to another recipient. The recipient may/may not be authorized to access the content. The determination of whether the recipient is authorized may be made by the messaging system. For example, the messaging system may access a network share to determine permissions for one or more recipients. According to an embodiment, the author sets the conditions on when to receive notifications for recipients receiving a forwarded message that are authorized to access the content. When one or more of the recipients is not authorized to access the linked content, the notification message includes permission options for setting permissions to the linked content for the recipients of the authorized message. For example, the author may permission the recipients as a group and/or individually (e.g. read/write, read, write, deny).

Transitioning to operation 740, a notification message is sent to a recipient of the forwarded message including the link that indicates that the author has been notified of the forwarding of the link and that the author has been requested to set the permission for the recipient to access the linked content.

Flowing to operation 750, permission settings are received from the author. According to an embodiment, the permission settings are set within a reply message. In this way, the settings may be made while the author is offline and when the author goes online again, the permission settings are sent within the reply message to the permission manager. When the author is online, the permission settings may be sent directly to the permission manager in response to selecting a permission option within the displayed permission options.

Moving to operation 760, a message is sent to a recipient of the forwarded message when the permissions for the recipient to access the linked content have been received from the author.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for setting permissions of links forwarded in an electronic message, comprising:
    detecting when a link that is contained within an electronic message that was created by an author and sent by the author to a first recipient is forwarded to a second recipient and a third recipient by the first recipient, wherein the second and third recipients were not recipients of the electronic message from the author, and wherein the link refers to an address that represents a location of linked content on a network;
    in response to detecting that the first recipient forwarded the electronic message to the second recipient and the third recipient, automatically sending a notification message to the author indicating that the electronic message including the link was forwarded from the first recipient to the second recipient and the third recipient;
    indicating to the author that the second recipient and the third recipient have access to the electronic message with the link but is unauthorized by the author to access the linked content associated with the link;
    sending, to the second recipient and the third recipient, a message that the second recipient and the third recipient do not have access to the linked content and that the author has been notified;
    after automatically sending, the notification message to the author indicating that the electronic message including the link was forwarded from the first recipient to the second recipient and the third recipient, receiving permission settings for the linked content from the author for controlling access to the linked content by the second recipient and the third recipient, wherein the permission settings include read, write, and read/write permission for the linked content, and wherein permission settings for the second recipient are different than permission settings for the third recipient: and
    after receiving the permission settings for the linked content from the author, setting the permissions of the linked content for the second recipient using the permission settings for the second recipient received from the author and setting the permissions of the linked content for the third recipient using the permission settings for the third recipient.

2. The method of claim 1, wherein receiving the permission settings from the author comprise receiving a reply message from the author that includes the permission settings.

3. The method of claim 1, wherein receiving the reply message from the author that includes the permission settings comprises receiving a reply to the notification message sent to the author that indicates that the electronic message including the link was forwarded to the second recipient.

4. The method of claim 1, further comprising sending a second informational message to the second recipient that indicates that the author has set the permissions of the link for the second recipient.

5. The method of claim 1, further comprising providing a selectable menu option within a display of the notification message sent to the author to set the permissions of the linked content.

6. The method of claim 1, further comprising providing a selectable menu option within a display of the notification message before it is sent to the second recipient that provides options for setting permissions of the linked content.

7. The method of claim 6, wherein the options for setting the permissions of the linked content comprise adding a user to the second recipient to set permissions of the link.

8. The method of claim 1, wherein the link that is contained within the electronic message that is created by the author includes automatically setting the permissions of the linked content for a fourth recipient.

9. A computer-readable storage medium that is not a signal storing computer-executable instructions for setting permissions of linked content with links that are forwarded in an electronic message, comprising:
    in response to detecting that an electronic message was forwarded to first and second unauthorized recipients, automatically sending a notification message to an author of the electronic message indicating that the electronic message including a link was forwarded to the unauthorized recipients, wherein the link refers to an address that references a location of linked content on a network;
    indicating that the first and second unauthorized recipients have access to the electronic message with the link but are unauthorized by the author to access the linked content associated with the link;
    sending, to the first and second unauthorized recipients, a message that the unauthorized recipients do not have access to the linked content and that the author has been notified;
    after automatically sending the notification message to the author indicating that the electronic message including the link was forwarded to the unauthorized recipients, receiving permission settings for the linked content in a reply message to the notification message from the author for setting permissions to the linked content, wherein the permissions include read, write, and read/write permission for the linked content, and wherein permission settings for the first unauthorized recipient are different than permission settings for the second unauthorized recipient; and
    after receiving the permission settings for the linked content from the author in the reply message to the notification message, setting the permissions of the linked content for the first unauthorized recipient using the received permissions from the author for the first unauthorized recipient and setting the permissions of the linked content for the second unauthorized recipient using the received permission from the author for the second unauthorized recipient.

10. The computer-readable storage medium of claim 9, further comprising sending a second informational message to the first unauthorized recipient that indicates that the author has set the permissions to the linked content for the first unauthorized recipient.

11. The computer-readable storage medium of claim 9, further comprising providing a selectable menu option within a display of the notification message sent to the author to set the permissions to the linked content.

12. The computer-readable storage medium of claim 9, further comprising providing a selectable menu option within a display of the notification message before it is sent to the first unauthorized recipient that provides options for setting permissions to the linked content.

13. The computer-readable storage medium of claim 12, wherein the options for setting the permissions to the linked content comprise adding a user to the first unauthorized recipient to the set permissions to the linked content.

14. The computer-readable storage medium of claim 9, wherein the link that is contained within the electronic message that is created by an author includes automatically setting the permissions to the linked content for the unauthorized recipient.

15. A system for setting permissions of links forwarded in an electronic message, comprising:
   a network connection that is configured to connect to a network;
   a processor, memory, and a computer-readable storage medium;
   an operating environment stored on the computer-readable storage medium and executing on the processor;
   a messaging application; and
   a permission manager operating in conjunction with the messaging application that is configured to perform actions comprising:
   detecting when a link that is contained within an electronic message that was created by an author and sent by the author to a first recipient is forwarded to a second recipient and a third recipient by the first recipient, wherein the second and third recipients were not recipients of the electronic message from the author, and wherein the link refers to an address that represents a location of linked content on a network;
   in response to detecting that the first recipient forwarded the electronic message to the second recipient and the third recipient, automatically sending a notification message to the author indicating that the electronic message including the link was forwarded to the second recipient and the third recipient; indicating that the second recipient and the third recipient have access to the electronic message with the link but is unauthorized by the author to access the linked content associated with the link;
   automatically sending an informational message to the second recipient and the third recipient that indicates that the second recipient and the third recipient do not have access to the linked content and that the author has been notified;
   after automatically sending the notification message to the author indicating that the electronic message including the link was forwarded to the second recipient and the third recipient, receiving permission settings for the link in a reply message to the notification message from the author for setting permissions of the link for the second recipient and the third recipient, wherein the permission settings include read, write, and read/write permission for the linked content and wherein permission settings for the second recipient are different than permission settings for the third recipient; and
   after receiving the permission settings for the linked content from the author in the reply message to the notification message, then setting the permissions to the linked content for the second recipient using the received permissions from the author and setting the permissions of the linked content: for the third recipient using the permission settings for the third recipient.

16. The system of claim 15, further comprising sending a second informational message to the second recipient that indicates that the author has set the permissions of the linked content for the second recipient.

17. The system of claim 15, further comprising providing a selectable menu option within a display of the notification message sent to the author to set the permissions of the linked content.

18. The system of claim 15, wherein the link that is contained within the electronic message that is created by an author includes automatically setting the permissions to the linked content for the second recipient.

* * * * *